(12) United States Patent
Griffin

(10) Patent No.: US 9,669,922 B2
(45) Date of Patent: Jun. 6, 2017

(54) FLOW RESTRICTION SYSTEM FOR REGULATING DYNAMIC PRESSURE LOSS

(71) Applicant: BELL HELICOPTER TEXTRON INC., Forth Worth, TX (US)

(72) Inventor: Maurice D. Griffin, Corpus Christi, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 121 days.

(21) Appl. No.: 14/573,413

(22) Filed: Dec. 17, 2014

(65) Prior Publication Data

US 2016/0176519 A1 Jun. 23, 2016

(51) Int. Cl.
*B64C 27/00* (2006.01)
*B01D 19/00* (2006.01)
*F16F 9/06* (2006.01)
*B64D 27/26* (2006.01)

(52) U.S. Cl.
CPC ........ *B64C 27/001* (2013.01); *B01D 19/0073* (2013.01); *B64D 27/26* (2013.01); *F16F 9/06* (2013.01); *B64C 2027/002* (2013.01); *B64D 2027/262* (2013.01)

(58) Field of Classification Search
CPC ............ B64C 27/001; B64C 2027/002; B01D 19/0073; B64D 27/26; B64D 2027/262; F16F 9/06
See application file for complete search history.

(56) References Cited

U.S. PATENT DOCUMENTS

| | | | | |
|---|---|---|---|---|
| 2,376,221 A * | 5/1945 | Baker | ................ | B01D 19/0078 366/118 |
| 3,853,500 A * | 12/1974 | Gassmann | ......... | B01D 19/0063 95/30 |
| 8,652,233 B2 * | 2/2014 | Kramer | .............. | B01D 19/0005 95/14 |
| 2002/0194907 A1 * | 12/2002 | Bostrom | ................ | E21B 34/08 73/152.58 |
| 2012/0279816 A1 * | 11/2012 | Smith | ..................... | F16F 13/08 188/269 |
| 2013/0175389 A1 * | 7/2013 | Griffin | .................... | F16F 13/24 244/54 |
| 2014/0064922 A1 * | 3/2014 | Smith | ..................... | F16F 13/08 415/118 |
| 2014/0202331 A1 * | 7/2014 | Iwata | ................. | B01D 19/0073 95/247 |

* cited by examiner

*Primary Examiner* — Valentina Xavier
(74) *Attorney, Agent, or Firm* — James E. Walton

(57) ABSTRACT

A vibration control system includes an outer housing, an inner housing carried within the outer housing, a fluid passage extending through the inner housing and in fluid communication with a first fluid reservoir and a second fluid reservoir on opposing sides of the inner housing, and a gas extraction system. The gas extraction system includes a gas reservoir in fluid communication with the first fluid reservoir, a removable cap secured to the outer housing, a lid removably attached to the cap, and a plurality of conduits extending through cap and lid and configured to provide fluid and gas communication between the first reservoir and the gas reservoir.

20 Claims, 7 Drawing Sheets

FLOW RESTRICTION SYSTEM FOR REGULATING DYNAMIC PRESSURE LOSS

BACKGROUND

1. Field of the Invention

The present application relates generally to vibration control systems, and more specifically, to aircraft dampers with gas accumulators.

2. Description of Related Art

Vibration control systems are well known in the art and are effective means to control the vibrations exerted against a non-vibration object by a vibrating object. For example, vibration control systems are commonly used on aircraft during flight. In one particular embodiment, as shown in FIGS. 1-3, the vibration control system includes a gas accumulator configured to remove gas bubbles from the fluid chambers of the vibration control system during use. In the exemplary embodiment, system 100 includes an inner housing 102 disposed within an outer housing 104. When installed, the inner housing attaches to a first support structure 106, while housing 104 secures to a separate second structure 108. The two housings are secured to each other via elastomeric means.

The inner housing 102 includes two fluid reservoirs 110, 112 in fluid communication with each other via a passage 114. During use, the movement of housing 102 causes the working fluid in the fluid reservoirs to travel through the passage, as depicted with an arrow D1. The flow restriction of the fluid through the passages creates a damping effect, which in turn controls the vibrations exerted on the system.

It should be understood that the working fluid carried within the fluid reservoirs creates gas bubbles, which in turn adversely affects the damping efficiency of the system. To overcome this problem, system 100 is further provided with means to remove the bubbles from the working fluid. To achieve this feature, system 100 is provided with a gas extractor system 116 in fluid communication with the fluid reservoir 112.

The gas extractor system 116 includes a cap 118 having a plurality of conduits 120 extending therethrough and configured to provide fluid and gaseous channeling between fluid reservoir 112 and a gas accumulator reservoir 122.

Although effective in removing gas bubbles from the working fluid, it should be understood that system 100 prohibits modifications of dynamic pressure regulations without adversely affecting the requirement to remove the gas bubbles in the working fluid. Thus, although the foregoing developments in the field of dampers represent great strides, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
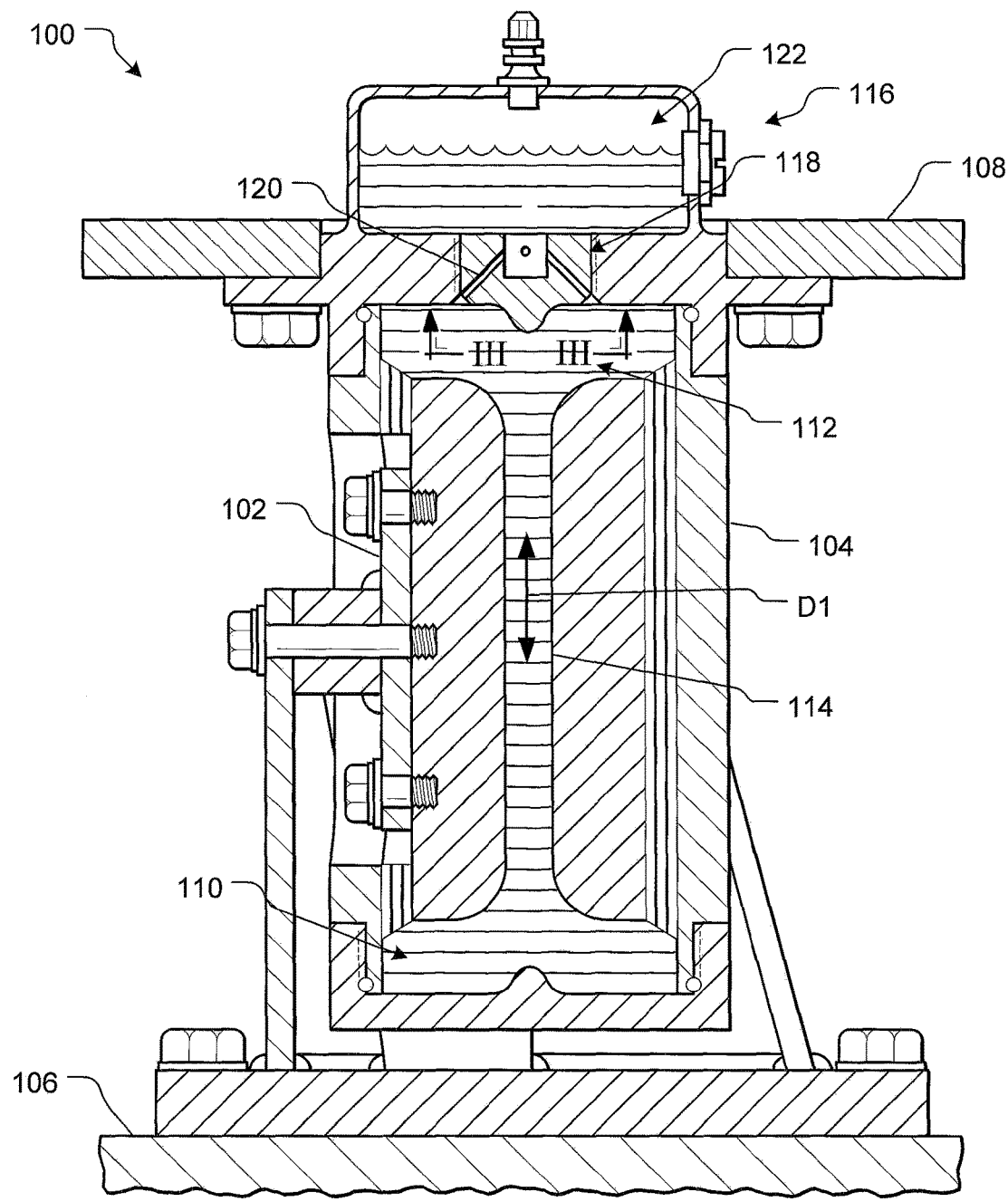
FIG. 1 is a front cross-sectional view of a conventional vibration control system.
Figure 2:
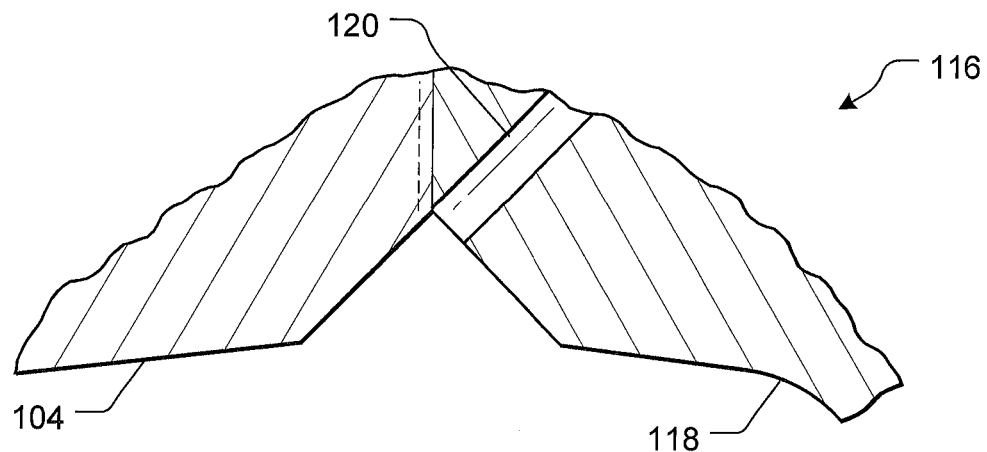
FIG. 2 is a front partial cross-sectional view of a gas accumulator cap of the system of FIG. 2.
Figure 3:
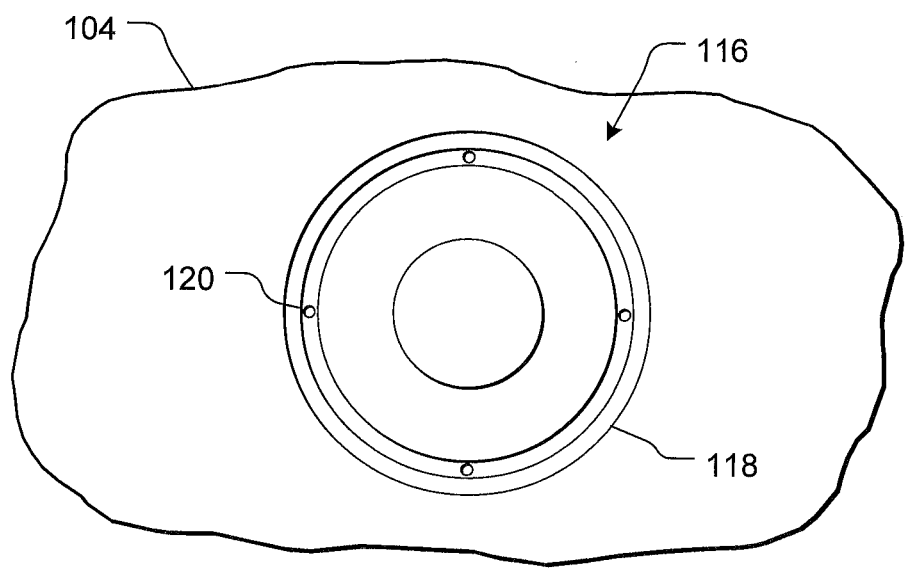
FIG. 3 is a partial bottom view of the cap of FIG. 1 taken at III-III.

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the apparatus and method are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system of the present application overcomes the abovementioned problems commonly associated with conventional vibration control systems. Specifically, the system of the present application includes a gas extraction system that is simple, lightweight and easily modified to minimize fluid dynamic pressure losses of the working fluid while also maintaining ideal gas removal parameters and allowing thermal expansion of the working fluid. Further detailed description of these features are provided below and illustrated in the accompanying drawings.

The system and method of the present application will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Figure 4:
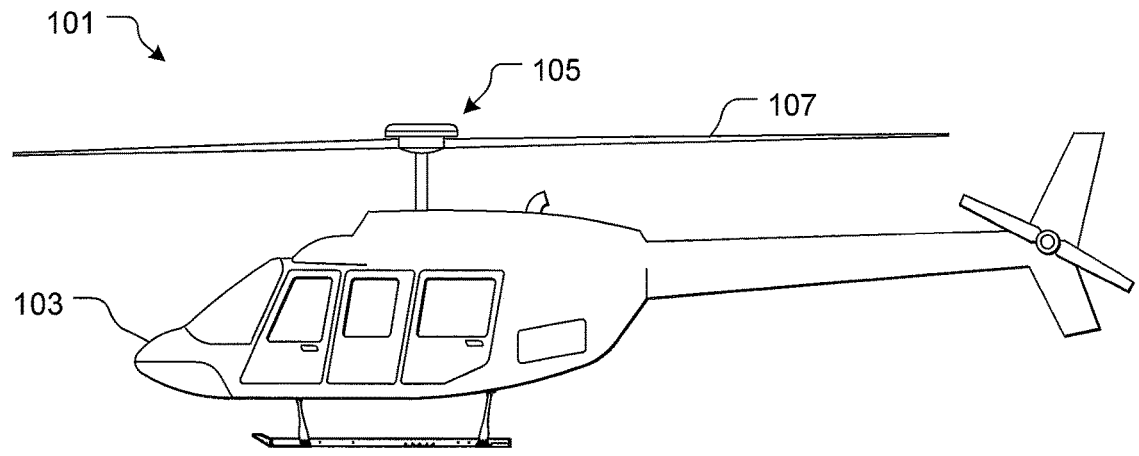
FIG. 4 is a side view of a helicopter according to a preferred embodiment of the present application.

Referring now to the drawings wherein like reference characters identify corresponding or similar elements throughout the several views, FIG. 4 depicts an aircraft 101 in accordance with a preferred embodiment of the present application. In the exemplary embodiment, aircraft 101 is a helicopter having a fuselage 103 and a rotor system 105 carried thereon. A plurality of rotor blades 107 is operably associated with rotor system 105 for creating flight.

Figure 5:
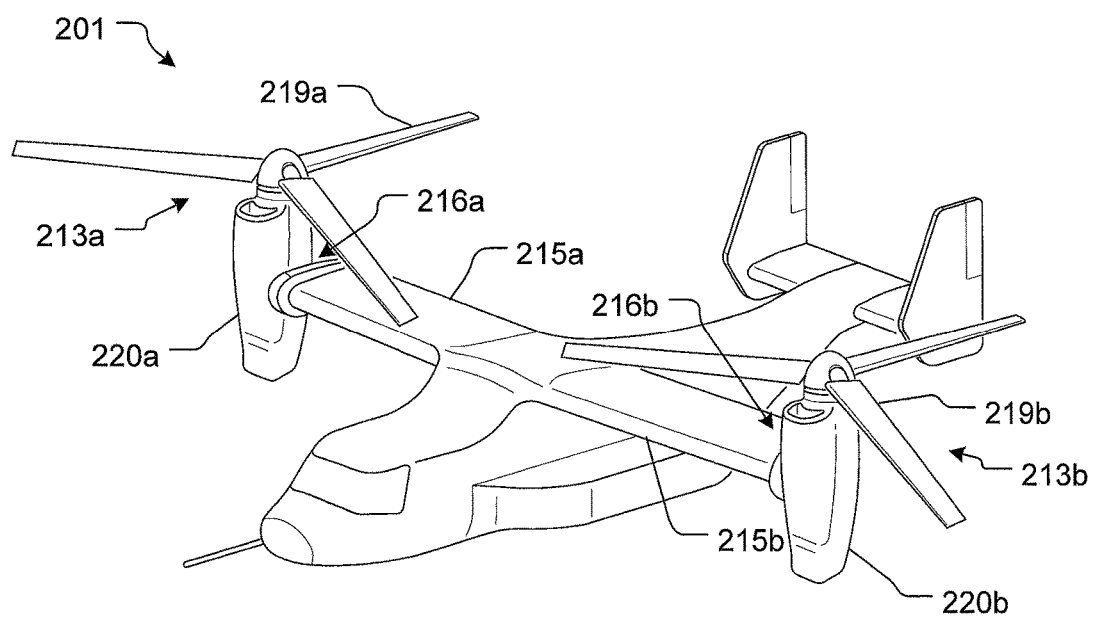
FIG. 5 is a perspective view of a tiltrotor aircraft according to an alternative embodiment of the present application.

Although shown associated with a helicopter, it will be appreciated that the system of the present application could also be utilized with different types of rotary aircraft and vehicles. For example, FIG. 5 illustrates a tiltrotor aircraft 201 that utilizes the system in accordance with the present application.

Tiltrotor aircraft 201 includes rotor assemblies 213a and 213b that are carried by wings 215a and 215b, and are disposed at end portions 216a and 216b of wings 215a and 215b, respectively. Tilt rotor assemblies 213a and 213b include nacelles 220a and 220b, which carry the engines and transmissions of tilt rotor aircraft 201, as well as, rotor proprotors 219a and 219b on forward ends 221a and 221b of tilt rotor assemblies 213a and 213b, respectively. Tilt rotor assemblies 213a and 213b move or rotate relative to wing members 215a and 215b between a helicopter mode in which tilt rotor assemblies 213a and 213b are tilted upward, such that tilt rotor aircraft 201 flies like a conventional helicopter; and an airplane mode in which tilt rotor assemblies 213a and 213b are tilted forward, such that tilt rotor aircraft 201 flies like a conventional propeller driven aircraft.

Figure 6:
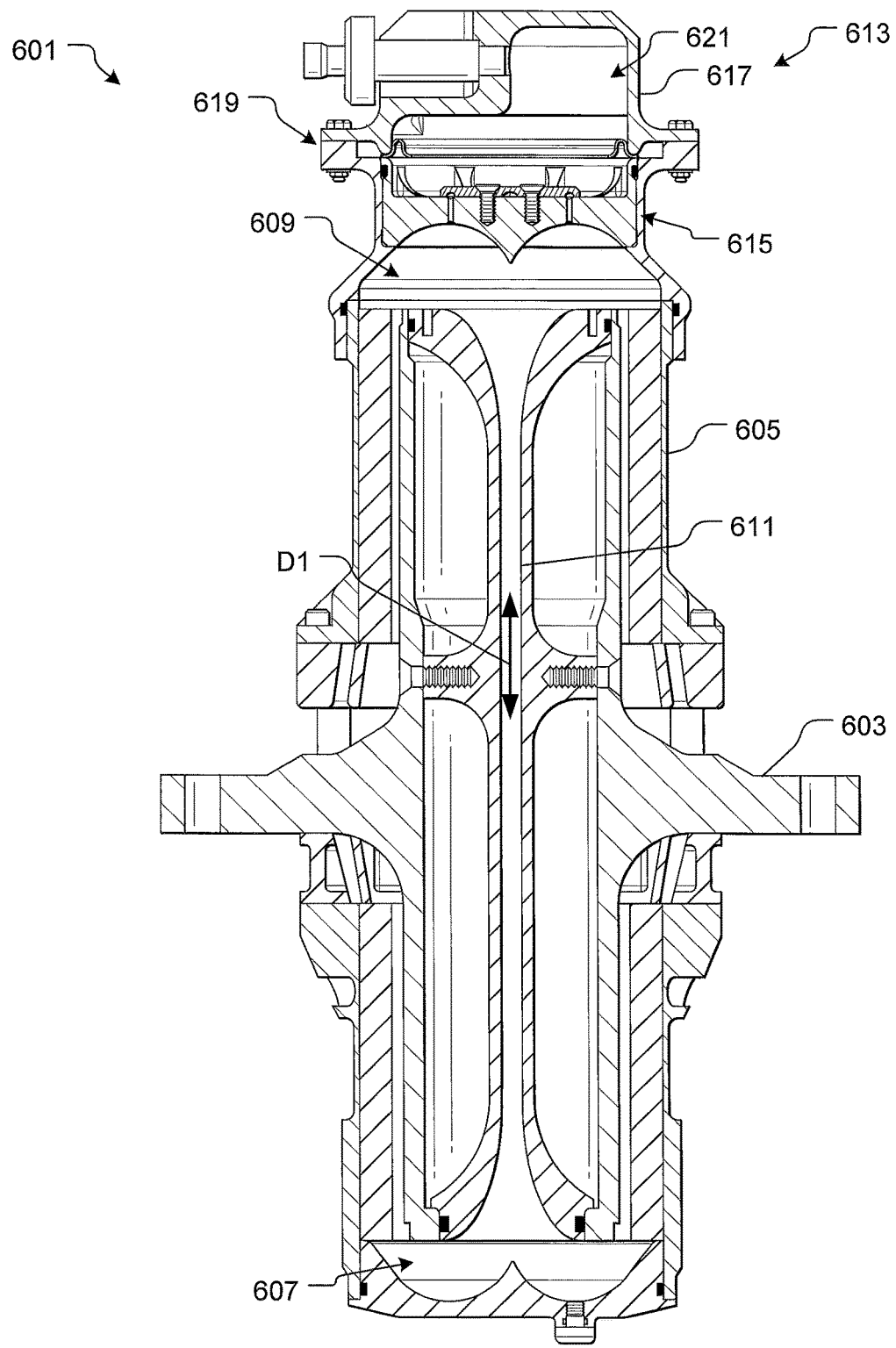
FIG. 6 is a front cross-sectional view of a vibration control system in accordance with a preferred embodiment of the present application.

Referring now to FIG. 6, a front cross-sectional view of a vibration control system 601 is shown in accordance with a preferred embodiment of the present application. It will be appreciated that system 601 overcomes one or more of the problems commonly associated with conventional vibration control systems, as discussed above.

System 601 includes an inner housing 603 disposed within and elastically attached to an outer housing 605. During use, the inner housing is configured to move within the outer housing. The two housings are separately attached to a non-vibrating structure and a vibrating structure and are configured to reduce, if not eliminate, the vibrations exerted between the two structures.

In the contemplated embodiment, inner housing 603 is positioned between two fluid reservoirs 607, 609, which in turn are in fluid communication via a passage 611 extending through housing 603. During use, the working fluid of the two reservoirs is channeled through passage 611, which controls the vibrations exerted on system 601.

One of the unique features believed characteristic of system 601 is the use of a gas extractor system 613 configured to remove gas from chamber 609. To achieve this desired feature, system 613 is provided with a cap 615 removably attached to housing 605 and secured thereto via a lid 617. The lid 617 is fastened to housing 605 via a locking device 619, which could include a plurality of bolts and nuts. The lid 617 forms a gas reservoir 621 configured to receive and store the accumulated gas bubbles.

Figure 7:
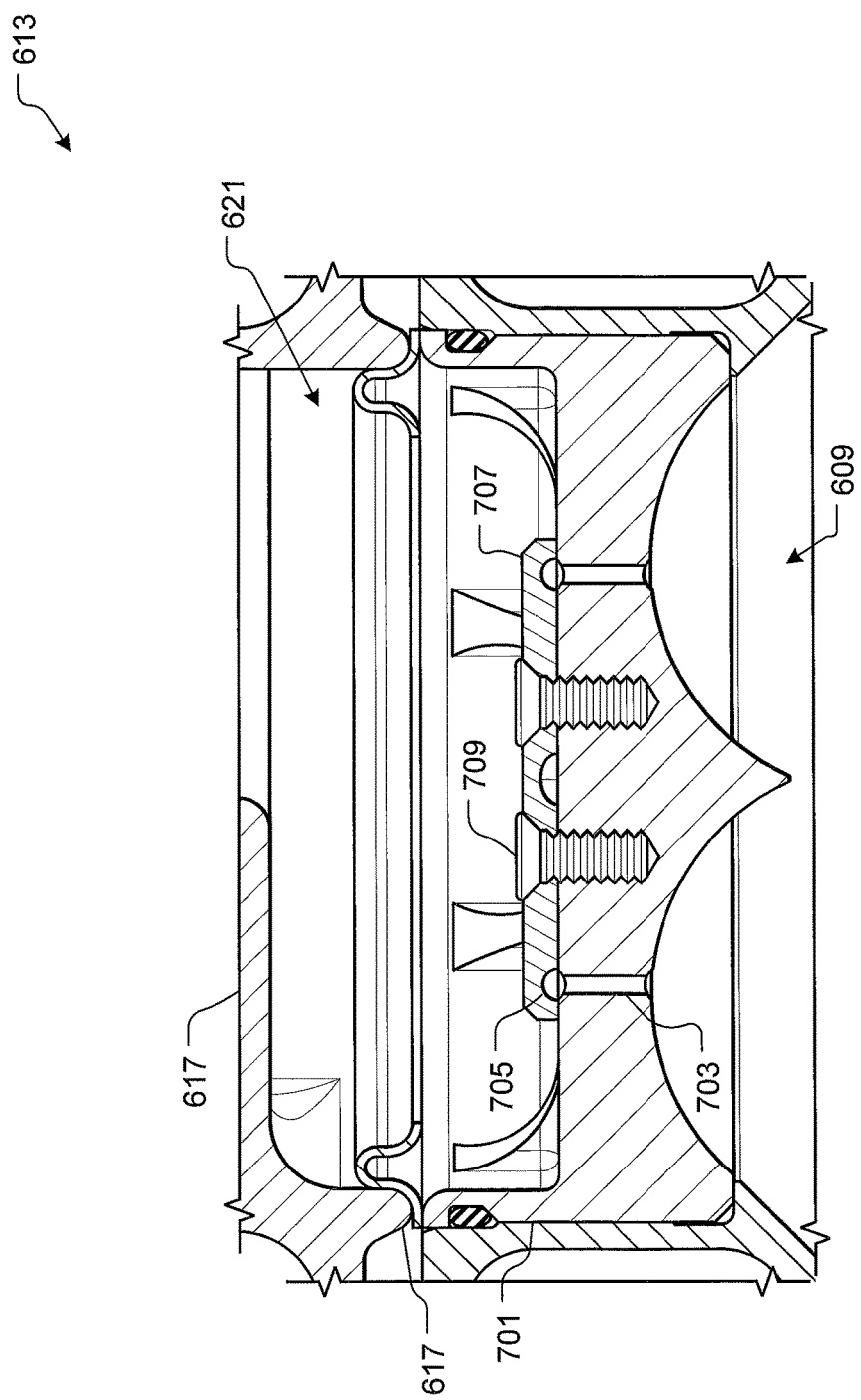
FIG. 7 is a front cross-sectional view of the gas extraction system of FIG. 6.

In FIG. 7, a partial side cross-sectional view of gas extraction system 613 is shown. In the contemplated embodiment, system 613 includes a cap 615 having a thickness and a plurality of conduits 703 passing therethrough. The conduits 703 provide means to channel both fluid and gas between the fluid reservoir 609 and the gas reservoir 621. More specifically, the conduits 703 are configured to channel the fluid and gas bubbles to an outer circular channel 705 of a plate 707, which in turn are in fluid communication with a plurality of channels 901 and ports 805. It will be appreciate that plate 707 is removably attached to base 701 via fasteners 709.

Figure 8:
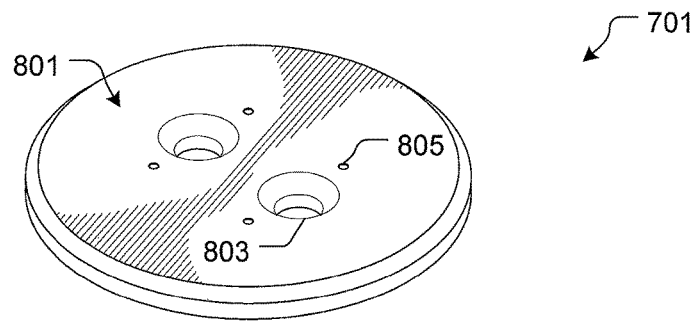
FIG. 8 is an oblique view of a plate of the gas extraction system of FIG. 7.
Figure 9:
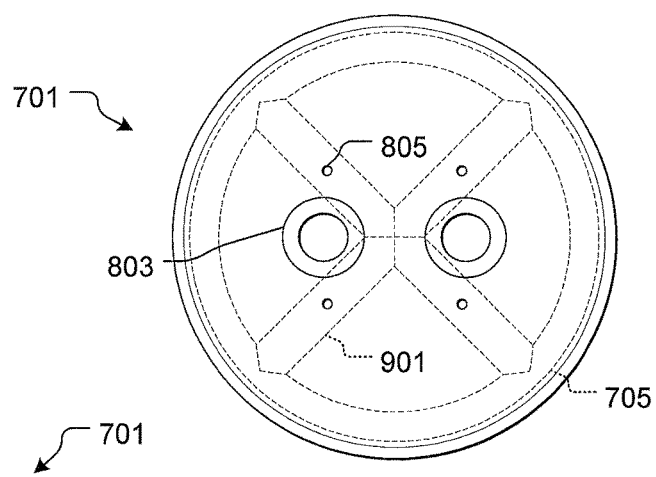
FIG. 9 is a top view of the plate of FIG. 8.
Figure 10:
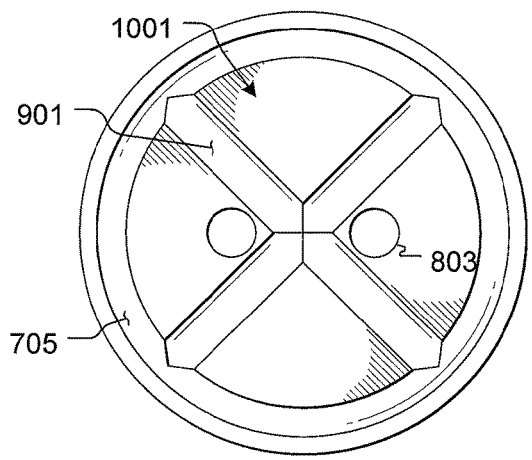
FIG. 10 is a bottom view of the plate of FIG. 8.

In FIGS. 8-10 various views of plate 701 are shown. Plate 701 includes a top surface 801 and a bottom surface 1001. A plurality of holes 803 extend through the thickness of plate 701 and are configured to receive fasteners 709.

One of the unique features of the plate 701 is the process of channeling the fluid/gas through outer circular channel 705 to a plurality of ports 805 in gas/fluid communication with channels 901. Thus, during operation, the gas bubbles and fluid first travel through the conduits 703, then through the circular channel 705, through channels 901, and finally exit through ports 805 into the gas reservoir. This feature allows the system to be simple, lightweight and easily modified to minimize fluid dynamic pressure losses of the working fluid while also maintaining ideal gas removal parameters and allowing thermal expansion of the working fluid.

Figure 11:
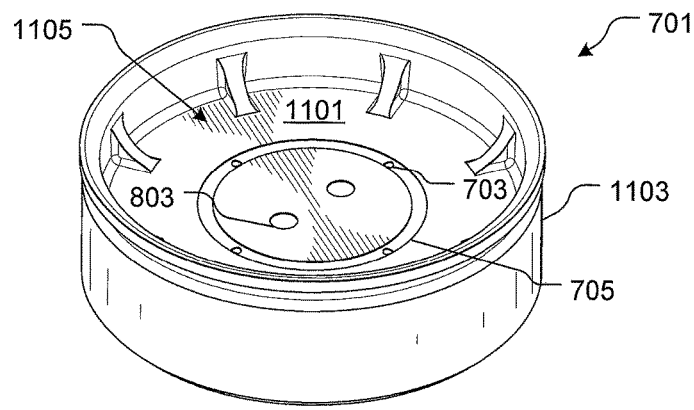
FIG. 11 is an oblique view of a cap of the gas extraction system of FIG. 8.
Figure 12:
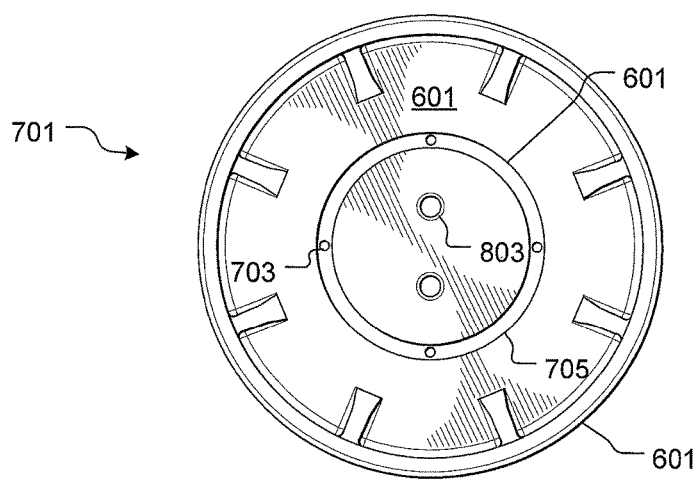
FIG. 12 is a top view of the cap of FIG. 11.
Figure 13:
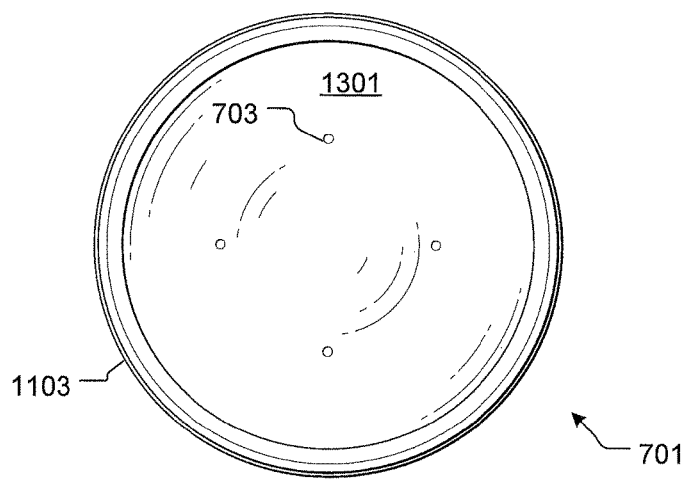
FIG. 13 is a bottom view of the cap of FIG. 11.

Referring now to FIGS. 11-13 in the drawings, various views of cap 701 are shown. In the contemplated embodiment, cap 701 includes a top surface 1101 and a bottom surface 1301. The plurality of conduits 803 extend from bottom surface 1301 to the circular channel 705 partially extending in the thickness of base 701 relative to surface 1101. Body 701 further includes a sidewall 1103 that forms a partial fluid reservoir 1105 configured to store gas and/or working fluid along with reservoir 621.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A vibration control system, comprising:
   an outer housing;
   an inner housing carried within the outer housing;
   a fluid passage extending through the inner housing and in fluid communication with a first fluid reservoir and a second fluid reservoir on opposing sides of the inner housing;
   a gas extraction system, having:
      a gas reservoir in fluid communication with the first fluid reservoir;
      a removable cap secured to the outer housing;
      a lid removably attached to the cap; and
      a plurality of conduits extending through cap and lid and configured to provide fluid and gas communication between the first reservoir and the gas reservoir.

2. The system of claim 1, further comprising:
   a fastener configured to secure the plate to the cap.

3. The system of claim 1, the plate having:
a circular plate channel in fluid communication with a plurality of cap conduits extending through a thickness of the cap.

4. The system of claim 3, further comprising:
a plurality of plate conduits disposed within a thickness of the plate and in fluid communication with the circular plate channel;
wherein the plurality of plate conduits extend tangent to the circular plate channel.

5. The system of claim 4, further comprising:
a plurality of plate ports in fluid communication with the plurality of plate conduits.

6. The system of claim 5, wherein the plurality of plate ports are offset from the cap conduits.

7. The system of claim 1, further comprising:
a lid configured to form the gas reservoir and configure to secure the cap to the outer housing.

8. The system of claim 7, further comprising:
a locking device configured to lock the lid to the outer housing.

9. The system of claim 1, the cap having a sidewall configured to form a gas reservoir.

10. An aircraft, comprising:
a vibrating structure;
a non-vibrating structure; and
a vibration control system configured to control the vibrations exerted on the non-vibrating structure via the vibrating structure, the vibration control system comprising:
an outer housing;
an inner housing carried within the outer housing;
a fluid passage extending through the inner housing and in fluid communication with a first fluid reservoir and a second fluid reservoir on opposing sides of the inner housing;
a gas extraction system, having:
a gas reservoir in fluid communication with the first fluid reservoir;
a removable cap;
a lid removably attached to the cap; and
a plurality of conduits extending through cap and lid and configured to provide fluid and gas communication between the first reservoir and the gas reservoir.

11. The aircraft of claim 10, further comprising:
a fastener configured to secure the plate to the cap.

12. The aircraft of claim 10, the plate having:
a circular plate channel in fluid communication with a plurality of cap conduits extending through a thickness of the cap.

13. The aircraft of claim 12, further comprising:
a plurality of plate conduits disposed within a thickness of the plate and in fluid communication with the circular plate channel;
wherein the plurality of plate conduits extend tangent to the circular plate channel.

14. The aircraft of claim 13, further comprising:
a plurality of plate ports in fluid communication with the plurality of plate conduits.

15. The aircraft of claim 14, wherein the plurality of plate ports are offset from the cap conduits.

16. The aircraft of claim 10, further comprising:
a lid configured to form the gas reservoir and configure to secure the cap to the outer housing.

17. The aircraft of claim 16, further comprising:
a locking device configured to lock the lid to the outer housing.

18. The aircraft of claim 10, the cap having a sidewall configured to form a gas reservoir.

19. A method to remove gas bubbles from a fluid reservoir of a vibration control system, the method comprising:
providing a vibration control system of claim 1; and
channeling gas bubbles through the cap and the plate of the gas extraction system from the first reservoir to the gas reservoir.

20. The method of claim 19, further comprising:
removably attaching the cap and the plate from the outer housing.

* * * * *